US 6,585,477 B1

(12) United States Patent
Lawrence

(10) Patent No.: US 6,585,477 B1
(45) Date of Patent: Jul. 1, 2003

(54) COUNTER-STACKER FOR FLAT FOOD PRODUCTS

(75) Inventor: Eric C. Lawrence, South El Monte, CA (US)

(73) Assignee: Lawrence Equipment, So. El Monte, CA (US)

( * ) Notice: Subject to any disclaimer, the term of this patent is extended or adjusted under 35 U.S.C. 154(b) by 0 days.

(21) Appl. No.: 09/888,236

(22) Filed: Jun. 22, 2001

(51) Int. Cl.[7] .............................................. B65G 57/04
(52) U.S. Cl. ................. 414/793.1; 414/790; 414/794.4; 198/597
(58) Field of Search .............................. 414/794.4, 790, 414/793.1, 30, 35; 198/597; 355/3; 271/276

(56) References Cited

U.S. PATENT DOCUMENTS

| 3,823,937 | A | * | 7/1974 | Hirafuji ..................... 271/197 |
| 3,915,316 | A | | 10/1975 | Pomara, Jr. |
| 3,971,481 | A | | 7/1976 | Longenecker et al. |
| 4,006,831 | A | | 2/1977 | Jimenez |
| 4,054,015 | A | | 10/1977 | Rowell |
| 4,392,765 | A | * | 7/1983 | Barton et al. ............... 198/374 |
| 4,519,700 | A | * | 5/1985 | Barker et al. ............... 271/226 |
| 4,530,632 | A | * | 7/1985 | Sela .......................... 198/493 |
| 4,620,826 | A | | 11/1986 | Rubio et al. |
| 4,760,777 | A | | 8/1988 | Welsh |
| 4,978,548 | A | | 12/1990 | Cope et al. |
| 5,253,762 | A | | 10/1993 | Duncan |
| 5,601,397 | A | | 2/1997 | Lopez et al. |
| 5,720,593 | A | | 2/1998 | Pleake |
| 5,763,861 | A | | 6/1998 | Herrera et al. |
| 5,842,557 | A | | 12/1998 | Montemayor et al. |
| 5,882,175 | A | * | 3/1999 | Villacieros Fernandez .. 271/218 |
| 5,918,533 | A | | 7/1999 | Lawrence et al. |
| 6,053,695 | A | | 4/2000 | Longoria et al. |
| 6,131,723 | A | * | 10/2000 | Schroader et al. ........... 198/398 |
| 6,168,370 | B1 | * | 1/2001 | Longoria et al. ........... 271/197 |

\* cited by examiner

Primary Examiner—Eileen D. Lillis
Assistant Examiner—Michael J. Kwon
(74) Attorney, Agent, or Firm—Perkins Coie LLP

(57) ABSTRACT

A counter-stacker includes an infeed conveyor having a plurality of lanes for containing planar food articles. A vacuum conveyor system is located adjacent to the infeed conveyor and includes a plurality of vacuum conveyors. Each vacuum conveyor includes a frame, a pair of pulleys rotationally mounted to the frame, a drive shaft coupled to one of the pair of pulleys, a vacuum generator for generating vacuum conditions within the frame, and a vacuum belt mounted to the pair of pulleys. Each vacuum conveyor is pivotable about one of the pair of pulleys. An oscillating catch cup frame containing a plurality of catch cups is used to stack the planar food articles.

18 Claims, 4 Drawing Sheets

COUNTER-STACKER FOR FLAT FOOD PRODUCTS

FIELD OF THE INVENTION

The field of the invention is stacking flat or planar food articles. More specifically, the invention relates to counter-stacker devices used to count and stack tortillas.

BACKGROUND OF THE INVENTION

In the production of flat food products such as tortillas, it is highly desirable to minimize the amount of labor required, since labor costs are a significant portion of the total cost of production. Various counter-stacker devices have been developed to automate the counting and stacking of planar food products or articles such as tortillas and other flat breads. Typically, counter-stackers or similar devices operate using one or more belts to transport the food article to a stacking device.

The stacking device preferably should be able to form a stack of planar food articles (typically cylindrically-shaped). The cylindrically-shaped stack is easier to handle and pack into finished product. Prior art stacking devices have utilized a variety of stacker configurations to stack planar food articles.

U.S. Pat. No. 4,760,777 discloses a tortilla stacker that uses a cylindrical stacking container disposed adjacent to a stack loading conveyor. The individual tortillas are projected from the conveyor into the stacking container.

U.S. Pat. No. 4,006,831 discloses an automatic tortilla counter and stacker that uses alignment arms to aid in forming the tortilla stack.

U.S. Pat. No. 5,763,861 discloses a stacker retainer belt that advances a stacker retainer. The stacker retainer has a semicircular stack retaining member to catch tostada articles from a transporting belt.

U.S. Pat. No. 4,620,826 discloses a vacuum belt system that suspends tortilla articles over a plurality of tines. The tortillas are pushed off of the vacuum belt by a piston mechanism onto the tines located beneath the vacuum belt.

U.S. Pat. No. 3,915,316 discloses a counting and stacking apparatus that uses an arcuate-shaped stacking rack that includes a plurality of vertical tines or rods. When the desired number of articles are stacked on the stacking conveyor against the rack, the rack rapidly retracts to release the stack for discharge.

U.S. Pat. No. 4,530,632 discloses a stacking apparatus that includes a stationary rack formed by a number of rods. As the tortilla drops from a vacuum belt, the tortilla contacts an arcuate aligning member which guides the tortilla as it drops onto the rack.

U.S. Pat. No. 5,253,762 discloses a stacking and counting device that uses a block having a partial cylindrical cut-out and guide to maintain the cylindrical configuration of the stack of tortillas.

Prior art devices have also employed shaking devices to aid in forming product stacks. For example, U.S. Pat. No. 4,054,015 discloses a chip packing apparatus that includes a vibration assembly associated with a cylindrical stacking tube to aid in stacking food chips. U.S. Pat. No. 5,720,593 discloses a shaker unit that shakes and jostles tortillas that are being stacked in a stacker. Similarly, U.S. Pat. No. 6,053,695 discloses a tortilla canister attached to a vibrator to jiggle down any misaligned tortillas.

While these types of prior art devices have performed with varying degrees of success, disadvantages remain. While vibration or shaking of the stacking device can improve stack formation, tortillas are sometimes offset from one another during stack formation.

Another disadvantage related to existing counter-stacker devices is their propensity to jam during operation. When the device becomes jammed, product will accumulate at the jam until the jammed product is removed. Typically, the entire counter-stacker device has to be stopped or paused to remove jammed products. Current counter-stacker devices typically operate with multiple rows or lanes of product. Consequently, if one lane of the counter-stacker device becomes jammed, the other lanes, which are not jammed, must also be stopped or paused. This decreases the overall product throughput for the device.

For example, in the apparatus disclosed in U.S. Pat. No. 4,620,826, if the vacuum belt were to malfunction or if product jammed during stacking, all four lanes (as shown in FIG. 3) would have to be stopped or paused while the device is repaired or the jam is removed. No tortilla products are stacked during this downtime.

Accordingly, there is a need for a device for stacking planar food articles that overcomes these disadvantages. The device should preferably be able to stack food articles on top of one another with little or no offset between different layers of the stack. In addition, the device should preferably operate with multiple lanes and permit individual lanes to be paused or stopped without disrupting the operation of the other lanes.

SUMMARY OF THE INVENTION

In a first aspect of the invention, a counter-stacker for stacking planar or flat food articles or products includes an infeed conveyor preferably having a plurality of lanes for containing planar food articles. A vacuum conveyor system is advantageously located adjacent to the infeed conveyor that includes a plurality of vacuum conveyors. Each vacuum conveyor may include a frame, a pair of pulleys rotationally mounted to the frame, a drive shaft coupled to one of the pair of pulleys, a vacuum generator or a connection to an external vacuum source for generating vacuum conditions within the frame, and a vacuum belt mounted to the pair of pulleys. The vacuum conveyor is preferably pivotable about one of the pair of pulleys.

In a second aspect of the invention, the counter-stacker according to the first aspect includes a plurality of catch cups located beneath the vacuum conveyors for stacking the planar food articles. The catch cups are preferably connected to an oscillating mechanism for oscillating the catch cups.

In a third aspect of the invention, the counter-stacker according to the first aspect includes a rejection device. When the vacuum conveyor is pivoted in an up position, a rejection device for the corresponding lane is engaged for rejecting planar food articles from being input onto the corresponding lane of the infeed conveyor.

In a fourth aspect of the invention, a method of stacking planar food articles includes the steps of transferring a planar food article to a vacuum conveyor. The planar food article is then transported to a region located above a catch cup. Oscillating motion is imparted on the catch cup. The planar food article is then dropped into the oscillating catch cup.

In a fifth aspect of the invention, a method of stacking planar food articles in a plurality of lanes includes the steps of feeding planar food articles to an infeed conveyor in a plurality of lanes. The planar food articles are transferred to a plurality of vacuum conveyors, with each vacuum conveyor preferably corresponding to a particular lane. One of the vacuum conveyors is pivoted from a down position to an up position. Next, planar food articles are prevented from being fed to the infeed conveyor at the lane corresponding to the pivoted vacuum conveyor.

It is an object of the invention to provide a counter-stacker that creates improved stacks of planar food articles. It is also an object of the invention to provide a counter-stacker that can continue to count and stack planar food articles during jams and malfunctions of the counter-stacker.

The invention resides as well in subcombinations of the features shown and described.

DETAILED DESCRIPTION OF THE PREFERRED EMBODIMENTS

Figure 1:
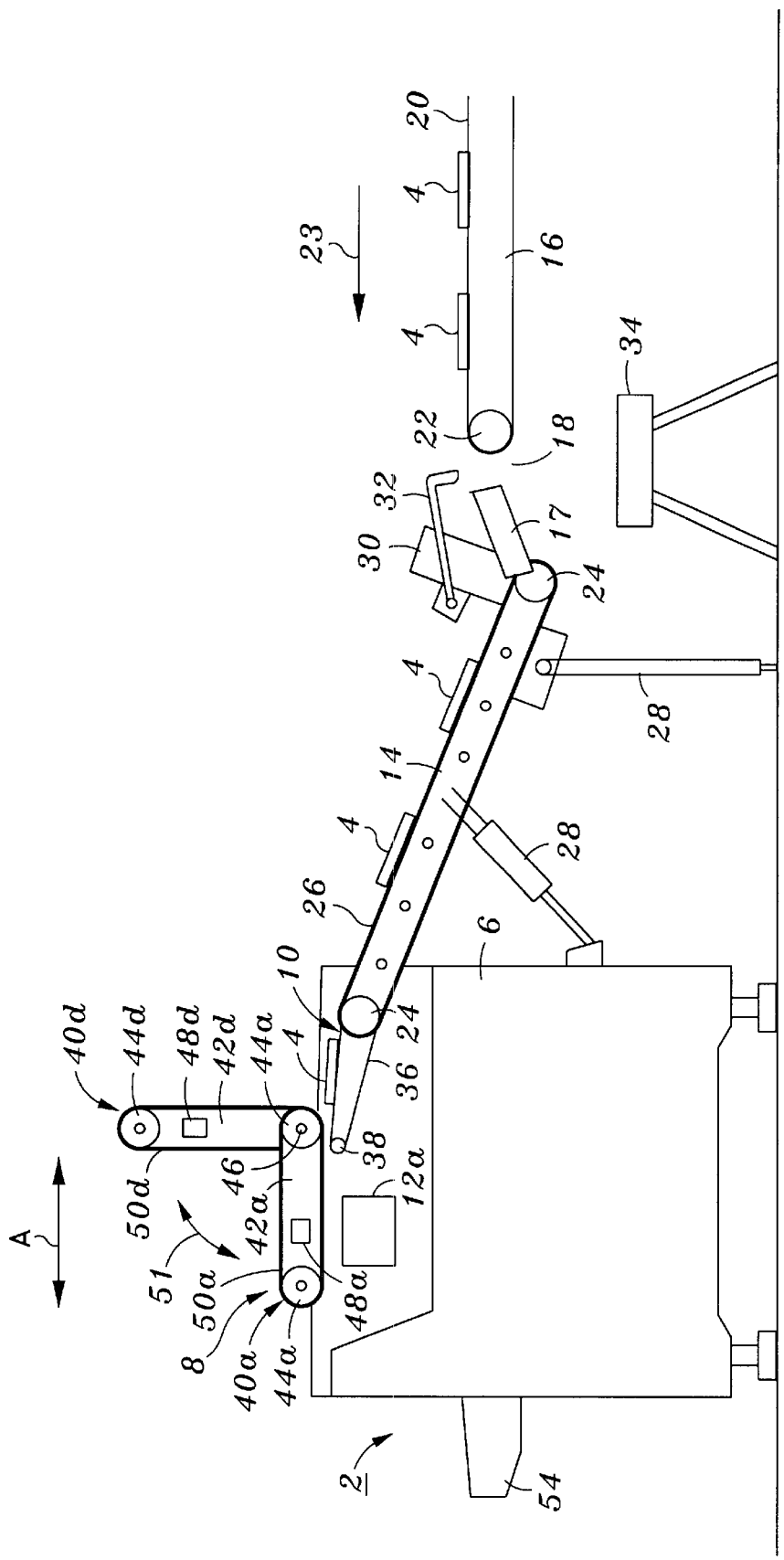
FIG. 1 is a side view of a counter-stacker device.

FIG. 1 shows a counter-stacker 2 for stacking planar food articles 4. Preferably, the planar food articles 4 are tortillas. Of course, other types of planar food articles 4 can be processed with the counter-stacker 2. A partial cut-away of the outer housing 6 of the counter-stacker 2 reveals the vacuum conveyor system 8, infeed conveyor 10, and a catch cup 12. The infeed conveyor 10 is preferably mechanically coupled to a transfer conveyor 14. Planar food articles 4 travel up the transfer conveyor 14 to the infeed conveyor 10. A transport conveyor 16 is located next to an infeed slide 17. The infeed slide 17 provides a transition from the transport conveyor 16 to the transfer conveyor 14. Between the terminal roller of the transport conveyor 16 and infeed edge of the infeed slide 17 there is a gap or nip 18 over which the food articles 4 pass.

The transport conveyor 16 includes a belt 20 on which the planar food articles 4 rest. The belt 20 rotates around a pulley or sprocket 22 and transports the planar food articles 4 in the direction of arrow 23 shown in FIG. 1.

The transfer conveyor 14 moves planar food articles 4 from the transport conveyor 16 to the infeed conveyor 10. The transfer conveyor 14 includes a pair of pulleys or sprockets 24 having a belt 26 mounted thereon. The belt 26 rotates in the counter-clockwise direction (as shown in FIG. 1) to deliver planar food articles 4 to the infeed conveyor 10. The transfer conveyor 14 is preferably inclined and supported by supports 28. The supports 28 are adjustable to accommodate various infeed heights. One or more rejection devices 30 are located at the upstream end of the transfer conveyor 14. Preferably, the rejection devices 30 are pneumatically-operated air jets 32. However, the rejection devices 30 can also employ mechanically-operated components to reject food articles 4. Preferably, there is one rejection device 30 for each lane of product. When the rejection device 30 is engaged to prevent planar food articles 4 from being transferred across the nip 18 from the transport conveyor 16 to the transfer conveyor 14, the planar food article 4 is deposited into the pan 34. The rejection device 30 is typically engaged where there is a product jam downstream of the transport conveyor 16 or when the vacuum conveyor 40 is an upright position.

The downstream end of the transfer conveyor 14 is coupled to the infeed conveyor 10. The infeed conveyor 10 includes a belt 36 that rotates around two sprockets or pulleys 24, 38. The infeed conveyor 10 inputs planar food articles to the vacuum conveyor system 8.

Figure 2:
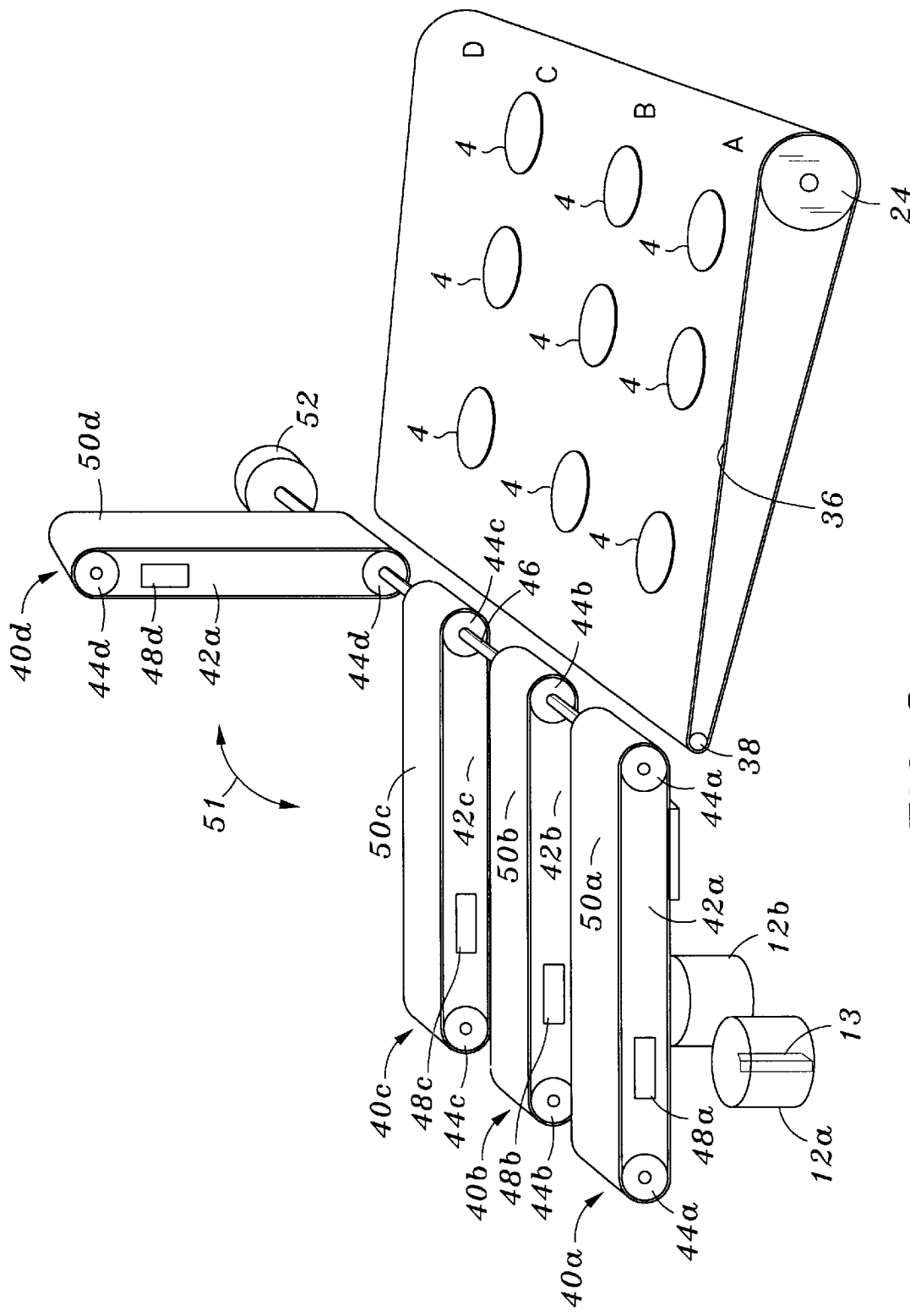
FIG. 2 is a partial perspective view of the vacuum conveyor system and infeed conveyor according to one aspect of the invention.

The vacuum conveyor system 8 is preferably located adjacent to the infeed conveyor 10. The vacuum conveyor system 8 preferably includes a plurality of vacuum conveyors 40(a), 40(b), 40(c), and 40(d). (FIG. 1 shows only two vacuum conveyors 40(a), 40(d) while FIG. 2 shows all four). The number of vacuum conveyors 40 preferably depends on the number of product lanes. FIG. 2, for example, shows four product lanes A, B, C, and D and four corresponding vacuum conveyors 40(a), 40(b), 40(c), and 40(d). Accordingly, in one preferred embodiment, each product lane A, B, C, and D has a corresponding vacuum conveyor 40(a), 40(b), 40(c), and 40(d). While four product lanes are illustrated in FIGS. 1 and 2, any number of product lanes and vacuum conveyors can be used. Typically, the number of product lanes ranges between one and eight lanes.

Figure 3:
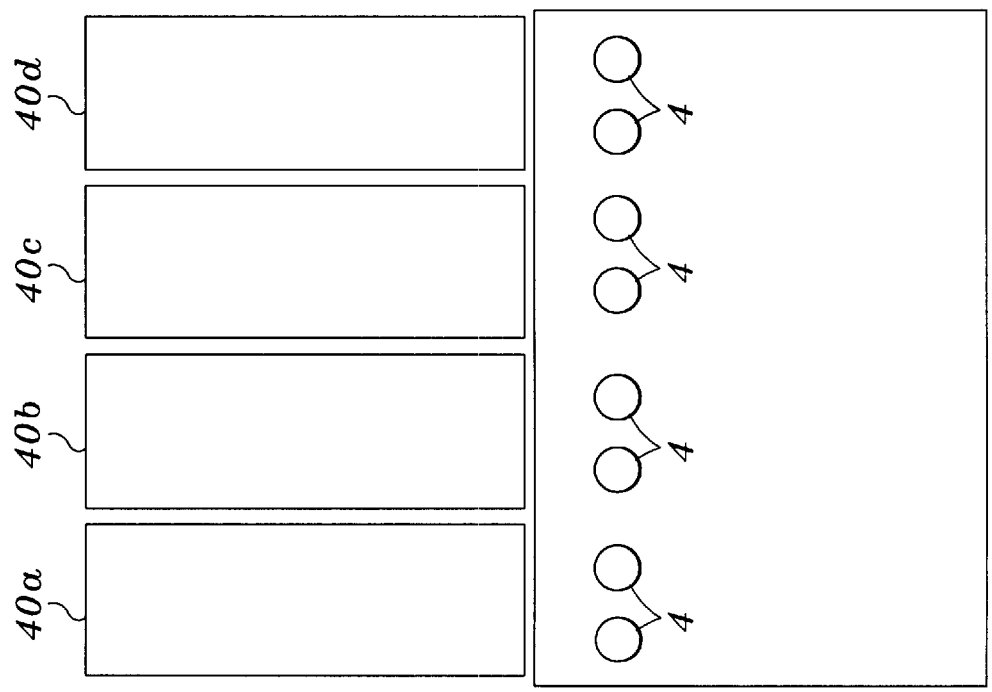
FIG. 3 is a top view of the plurality of vacuum conveyors and the infeed conveyor according to one embodiment.

In another embodiment of the invention, multiple product lanes can be shared with a single vacuum conveyor. For example, FIG. 3 illustrates an eight lane embodiment that utilizes four vacuum conveyors 40(a), 40(b), 40(c), and 40(d). Thus, each vacuum conveyor 40 processes two lanes. Of course, the vacuum conveyors can process any number of product lanes. By sharing multiple lanes with a single vacuum conveyor 40, the counter-stacker 2 requires a smaller number of vacuum conveyors 40. If too many product lanes are shared, however, the beneficial aspects of the invention are reduced.

Figure 4:
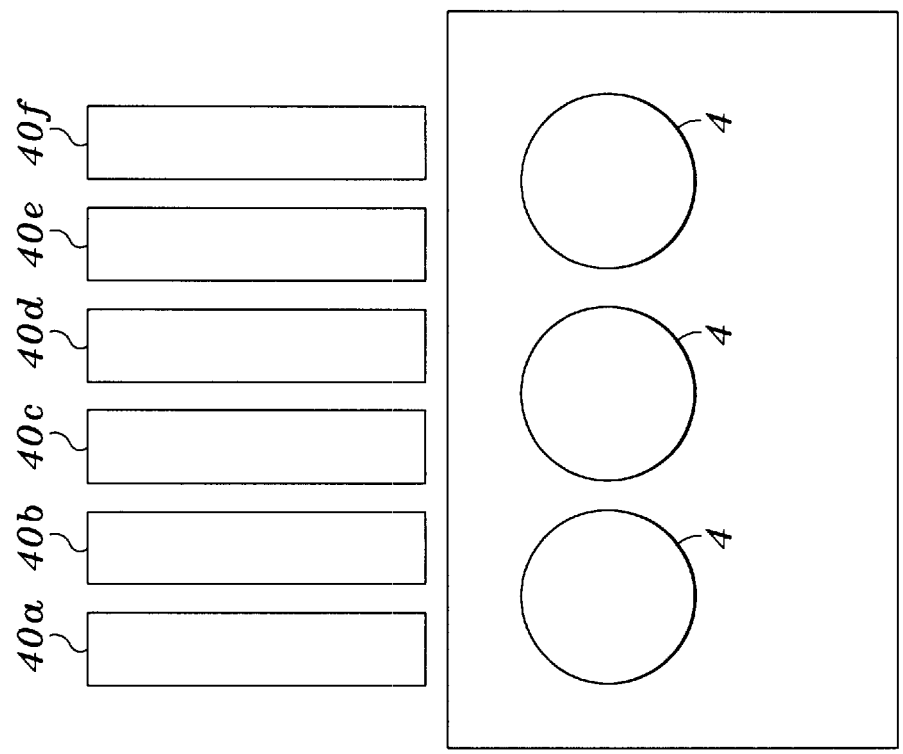
FIG. 4 is a top view of the plurality of vacuum conveyors and the infeed conveyor according to another embodiment.

In still another embodiment of the invention, as seen in FIG. 4, a single product lane utilizes two vacuum conveyors 40(a–b), 40(c–d), and 40(e–f). In the embodiment shown in FIG. 4, six vacuum conveyors 40 (a–f) process three lanes of planar food articles 4. Other configurations are also possible however (i.e., four vacuum conveyors and two lanes, etc.). Preferably, the counter-stacker 2 can switch configurations depending on the type and size of the product that is being run. For example, the device 2 of FIG. 4 can be used to process six rows of product having diameters of around 6". Alternatively, the same device 2 can be used to process three rows of product having diameters of around 12"(as is shown in FIG. 4).

Returning to FIGS. 1–3, each vacuum conveyor 40(a), 40(b), 40(c), and 40(d) includes a frame 42(a–d), a pair of pulleys 44(a–d) mounted to the frame 42(a–d), a drive shaft 46 coupled to one of the pair of pulleys 44(a–d), a vacuum generator 48(a–d) for generating vacuum conditions within the frame 42(a–d), and a vacuum belt 50(a–d). The frame 42(a–d) includes a plurality of holes therein (not shown) to create localized vacuum conditions on the bottom of the vacuum conveyors 40(a), 40(b), 40(c), and 40(d) to hold the planar food articles 4 during the counting and stacking operation. The vacuum generator 48(a–d) preferably comprises a fan or turbine that evacuates air from within the frame 42(a–d). Alternatively, the vacuum generator(s) 48 may be located external to the vacuum conveyors 40(a–d) In this case, each vacuum conveyor 40 (a–d) would be connected to one or more vacuum generators 48 via tubing or the like to an external vacuum source. In this regard, the complexity (in terms of parts, costs to manufacture, repairs, etc.) is reduced.

Referring now to FIGS. 1 and 2, the plurality of vacuum conveyors 40(a), 40(b), 40(c), and 40(d) are pivotable about the drive shaft 46 as shown by arrow 51. During operation, the vacuum conveyors 40(a), 40(b), 40(c), and 40(d) are in the down position. The vacuum conveyors 40(a), 40(b), 40(c), and 40(d) are pivoted upward when there is a malfunction or jam in the stacking operation. FIGS. 1 and 2 show vacuum conveyor 40(d) in the up position with the remaining vacuum conveyors 40(a), 40(b), and 40(c) in the down position.

In a preferred embodiment, the vacuum conveyors 40(a), 40(b), 40(c), and 40(d) share a common drive shaft 46. In this embodiment, the drive shaft 46 is coupled to a motor or servo 52 for driving the drive shaft 46.

In another preferred embodiment, the vacuum conveyors 40(a–d) are moveable in the forward and backward direction, as shown by arrow A shown in FIG. 1. This movement allows for cleaning of the vacuum conveyors 40(a–d) and for positioning of the final product release point of the vacuum conveyors 40(a–d).

Still referring to FIGS. 1 and 2, one or more catch cups 12 are located beneath the vacuum conveyor system 8 (FIG. 1 shows catch cup 12(a) only since the others are obstructed from view. Likewise FIG. 2 shows only catch cups 12(a) and 12(b)). Preferably, each vacuum conveyor 40(a), 40(b), 40(c), and 40(d) is associated with a corresponding catch cup 12. However, multiple vacuum conveyors 40(a–d) may share a common catch cup 12, as is the case in the embodiment shown in FIG. 4. The catch cups 12(a–d) catch and stack the falling planar food articles 4 from the vacuum conveyor system 8. A counting mechanism 13 is also included in the counter-stacker 2. The counting mechanism counts the number of planar food articles 4 in the stack via optical or mechanical contact sensors. When the desired number of planar food articles 4 have been stacked, the stack is transferred to an exit chute 54.

Figure 5:
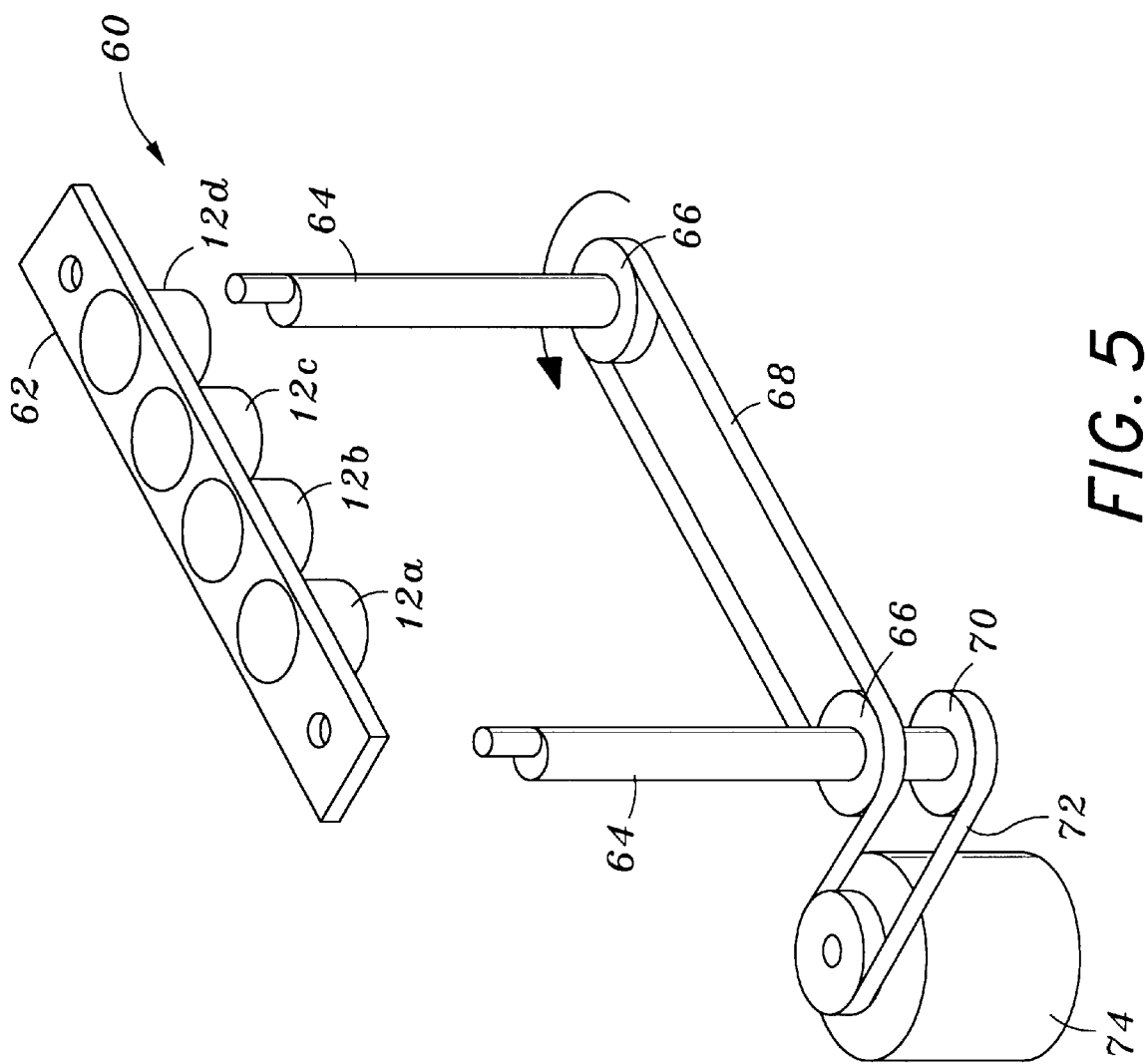
FIG. 5 is a partially exploded view of a catch cup assembly.

FIG. 5 illustrates one embodiment of a catch cup assembly 60 used to collect and stack planar food articles 4. The catch cup assembly 60 includes catch cup frame 62 that contains a plurality of catch cups 12(a), 12(b), 12(c), and 12(d). Preferably, the number of catch cups 12 equals the number of vacuum conveyors 40. The catch cup frame 62 is mounted on two eccentrically offset shafts 64. The eccentrically offset shafts 64 include toothed wheels or sprockets 66 that engage with a timing belt 68. One of the eccentrically offset shafts 64 includes an additional toothed wheel or sprocket. 70. A driving belt 72 engages with the toothed wheel 70 and a motor or servo 74.

The motor 74 causes the eccentrically offset shafts 64 to rotate. The catch cup frame 62, which is mounted to the eccentrically offset shafts 64, moves or precesses in an oscillating manner. The precess motion of the catch cups 12(a), 12(b), 12(c), and 12(d) causes the planar food articles 4 to rotate into position inside catch cups 12(a), 12(b), 12(c), and 12(d). The oscillating motion centers the planar food articles 4 on top of each other in a more precise and accurate way than prior art vibrational techniques.

During operation of the counter-stacker 2, planar food articles 4 are transported on the transport conveyor 16 in a plurality of lanes. FIG. 2 shows four of such lanes A, B, C, and D (lane D is shown without planar food articles 4). Assuming that all of the vacuum conveyors 40(a), 40(b), 40(c), and 40(d) are in the down position, all four lanes of planar food articles 4 pass over nip 18 and onto the transfer conveyor 14. The planar food articles 4 then pass to the infeed conveyor 10 and are transferred to the vacuum conveyors 40(a), 40(b), 40(c), and 40(d). The planar food articles 4 travel on the underside of the vacuum conveyors 40(a), 40(b), 40(c), and 40(d) until the planar food articles 4 are located above their respective catch cups 12(a), 12(b), 12(c), and 12(d). The planar food articles 4 then fall from the vacuum belts 50(a), 50(b), 50(c), and 50(d) into the catch cups 12(a), 12(b), 12(c), and 12(d) for counting and stacking.

FIGS. 1 and 2 illustrate operation of the counter-stacker 2 when one of the four lanes, lane D, is stopped or paused due to product jamming or a malfunction in equipment. Vacuum conveyor 40(d) is shown in the raised or up position. In this position, the rejection device 30 corresponding to lane D is engaged and planar food articles 4 in lane D are shunted to the pan 34 rather than to the transfer conveyor 14. The three remaining lanes, lanes A–C, continue to operate. In this manner, product can still be counted and stacked while the lane with the problem is worked on. As seen in FIG. 2, lane D does not have any planar food articles 4 on top of the infeed conveyor 10. Consequently, additional product is not fed to the jammed or malfunctioning vacuum conveyor 40.

Each vacuum conveyor 40(a), 40(b), 40(c), and 40(d) includes a switch like device (not shown) that is electrically or mechanically connected to the corresponding rejection device 30. In this manner, the appropriate rejection device 30 is engaged/disengaged when the corresponding vacuum conveyor 40 is engaged/disengaged. In embodiments where a single vacuum conveyor 40 transports multiple lanes, such as that disclosed in FIG. 3, a single vacuum conveyor 40 may trigger multiple rejection devices 30.

While embodiments of the present invention have been shown and described, various modifications may be made without departing from the scope of the invention. The invention, therefore, should not be limited, except to the following claims, and their equivalents.

What is claimed is:

1. A machine for collecting flat food products comprising:
   an infeed conveyor having a plurality of lanes for conveying flat food or products;
   a vacuum conveyor system located adjacent to the infeed conveyor and comprising a plurality of vacuum conveyors;
   a catch cup beneath each of the vacuum conveyors, for collecting the flat food products, with each catch cup connected to an oscillating mechanism.

2. The machine of claim 1 wherein each vacuum conveyor includes:
   a frame;
   a vacuum belt rotatably mounted on the frame; and
   a vacuum source for generating a vacuum on the vacuum belt.

3. The machine of claim 1 wherein the vacuum conveyor is pivotable relative to the infeed conveyor.

4. The machine of claim 1, with each vacuum conveyor including:
   a frame;
   a pair of pulleys rotationally mounted to the frame;
   a drive shaft coupled to one of the pair of pulleys;
   a vacuum generator for generating vacuum conditions within the frame;
   a vacuum belt mounted to the pair of pulleys; and
   wherein the vacuum conveyor is pivotable about one of the pair of pulleys.

5. The machine of claim 4, wherein the plurality of vacuum conveyors share a common drive shaft.

6. The machine of claim 1, further including a counter for counting articles into the catch cups.

7. The machine of claim 1, further comprising a transfer conveyor located adjacent to the infeed conveyor.

8. The machine of claim 7, with the transfer conveyor including a rejection device for rejecting planar food articles.

9. The machine of claim 7, wherein the transfer conveyor includes a plurality of rejection devices located at one end thereof for rejecting planar food articles from being transferred to the transfer conveyor, wherein each product lane is associated with a separate rejection device.

10. The machine of claim 9, with the plurality of vacuum conveyors being pivotable between a down position and an up position, wherein when one of the plurality of vacuum conveyors is positioned in the up position, a rejection device for the corresponding lane is engaged for rejecting planar food articles from being transferred to the transfer conveyor.

11. A stacker for stacking flat food products comprising:
- an infeed conveyor having a plurality of lanes for conveying flat food products;
- a vacuum conveyor system located adjacent to the infeed conveyor and including a plurality of vacuum conveyors, with each vacuum conveyor comprising:
  - a frame;
  - a vacuum belt mounted for rotation about the frame;
  - a vacuum generator for generating a vacuum through the vacuum belt;
  - wherein each of the vacuum conveyors is pivotable between an up position and a down position, and wherein when a vacuum conveyor is in the up position, a rejection device is engaged for rejecting flat food products from being input to the vacuum conveyor in the up position.

12. The stacker of claim 11, wherein the plurality of vacuum conveyors share a common drive shaft for rotating the vacuum belt of each vacuum conveyor.

13. The stacker of claim 12, further comprising a motor coupled to the drive shaft.

14. A method of stacking food articles comprising the steps of:
- transferring a food product to a vacuum conveyor;
- transporting the food product on the vacuum conveyor to a region located above a catch cup;
- oscillating the catch cap; and
- dropping the food product into the oscillating catch cup.

15. A method of stacking planar food articles in a plurality of lanes comprising the steps of:
- feeding the planar food articles to a plurality of vacuum conveyors, each vacuum conveyor corresponding to a particular lane;
- stacking the planar food articles in a plurality of catch cups located beneath the plurality of vacuum conveyors;
- pivoting at least one vacuum conveyor from a down position to an up position so as to prevent the feeding of planar food articles to the at least one vacuum conveyor in the up position; and
- wherein the planar food articles continue to be stacked by the vacuum conveyor(s) positioned in the down position.

16. A stacker for stacking planar food articles comprising:
- an infeed conveyor having a plurality of lanes for containing planar food articles;
- a vacuum conveyor system located adjacent to the infeed conveyor, the vacuum conveyor system comprising a plurality of vacuum conveyors, with each vacuum conveyor pivotable relative to the infeed conveyor;
- a plurality of catch cups located beneath the plurality of vacuum conveyors for stacking the planar food articles, wherein the catch cups are connected to an oscillating mechanism for oscillating the catch cups.

17. A stacker for stacking planar food articles comprising:
- an infeed conveyor having a plurality of lanes for containing planar food articles;
- a vacuum conveyor system located adjacent to the infeed conveyor, the vacuum conveyor system comprising a plurality of vacuum conveyors, with each vacuum conveyor pivotable relative to the infeed conveyor;
- a transfer conveyor located adjacent to the infeed conveyor, the transfer conveyor including a rejection device located at one end thereof for rejecting planar food articles from being transferred to the transfer conveyor;
- wherein the plurality of vacuum conveyors are pivotable between a down position and an up position, wherein when a vacuum conveyor is positioned in the up position, the rejection device is engaged for rejecting planar food articles from being transferred to the transfer conveyor.

18. A stacker for stacking planar food articles comprising:
- an infeed conveyor having a plurality of lanes for containing planar food articles;
- a vacuum conveyor system located adjacent to the infeed conveyor, the vacuum conveyor system comprising a plurality of vacuum conveyors, with each vacuum conveyor pivotable relative to the infeed conveyor;
- a transfer conveyor located adjacent to the infeed conveyor, the transfer conveyor including a plurality of rejection devices located at one end thereof for rejecting planar food articles from being transferred to the transfer conveyor, wherein each product lane is associated with a separate rejection device;
- wherein the plurality of vacuum conveyors are pivotable between a down position and an up position, wherein when one of the plurality of vacuum conveyors is positioned in the up position, a rejection device for the corresponding lane is engaged for rejecting planar food articles from being transferred to the corresponding lane of the transfer conveyor.

* * * * *